Oct. 4, 1932.     G. C. LEWIS     1,881,084
MANUFACTURE OF CARBON BLACK
Filed July 7, 1930
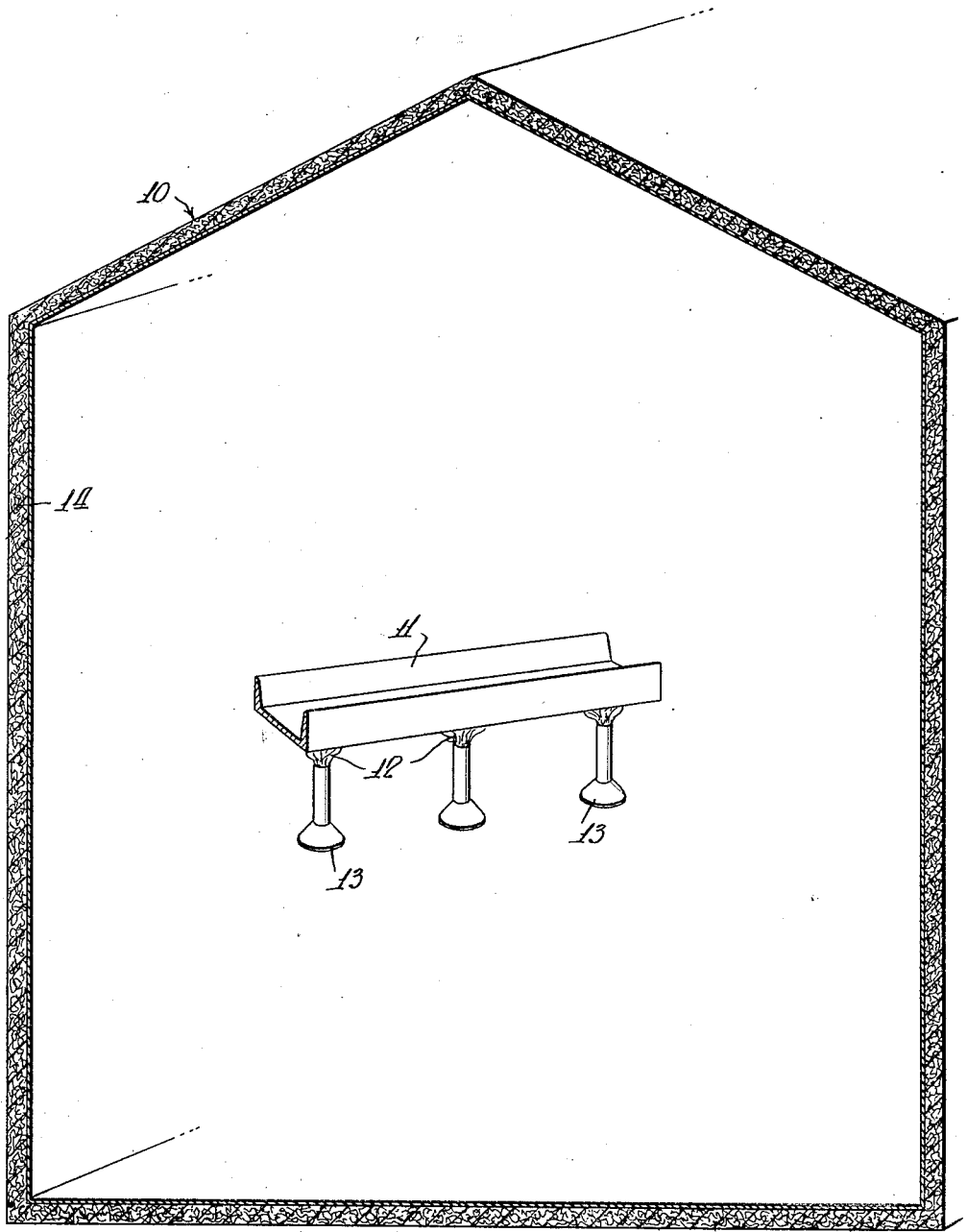
INVENTOR
*George Charles Lewis*
BY
ATTORNEY Patented Oct. 4, 1932

1,881,084

UNITED STATES PATENT OFFICE

GEORGE CHARLES LEWIS, OF NEW DORP, NEW YORK, ASSIGNOR TO COLUMBIAN CARBON COMPANY, OF NEW YORK, N. Y., A CORPORATION OF DELAWARE

MANUFACTURE OF CARBON BLACK

Application filed July 7, 1930. Serial No. 466,066.

This invention relates to the manufacture of carbon black, and more particularly to a new and improved process and apparatus whereby a greater yield of carbon black having improved characteristics is obtained.

In certain processes of manufacturing carbon black, a hydrocarbon flame is impinged on one side of a carbon black depository such as an iron plate, and the deposited black subsequently removed. These hydrocarbon flames with their associated depositories are confined in a shed or so-called "hot house". The average temperature of such a "hot house" below the burner pipe may be approximately 1000 to 1100° F., whereas the temperature between flames may approximately be 1100 to 1250° F., this temperature varying according to the distance between the burner tips.

In accordance with the present invention, it has been found that if the ordinary temperature of the atmosphere in the "hot house" is raised above that ordinarily used, an appreciable increase in yield of carbon black results. However, it is important that this increase in temperature of the "hot house" atmosphere should proceed without unduly affecting the quantity of air entering therein. If the draught of incoming air is checked or decreased, the interior of the "hot house" becomes dense with smoke which is not carbon black and the substance deposited on the plates has inferior and undesirable qualities. On the other hand, when an excess of air enters there is less loss of carbon and smoke, but an appreciable quantity of carbon in the flame, however, is consumed as $CO$ and $CO_2$.

One way in which the temperature of this "hot house" can be raised above that ordinarily produced by the impingement of the hydrocarbon flame alone is by means of the addition of heat from an external source. This may take the form of an electrical heating system, a steam heating system or any other suitable heating system in which no gases of combustion are produced which would commingle with the atmosphere in the "hot house". However, it is found preferable and more economical to maintain the temperature of the "hot house" at a high point by checking the radiation of the heat from the walls thereof. This can be done by insulating the outside walls of a metallic enclosure or by using an enclosure of non-ferrous construction. If a sheet metal wall is utilized, the radiation thereof may be checked by providing a secondary wall with dead air space as insulation, or by coating or lining the wall with insulating material.

The invention further consists in the new and novel features of operation, and the new and original arrangement and combinations of steps in the process as well as original features of construction and combination of parts hereinafter set forth and claimed.

In the accompanying drawing there is shown for purposes of illustration one apparatus by means of which the present process may be carried on.

In accordance with a concrete exemplification of the present invention, there is provided a shed 10 constructed of sheet metal material and having disposed therein a carbon black forming apparatus including a plate which may take the form of a channel 11. On the underside of said channel there are disposed a plurality of hydrocarbon flames 12 which impinge on said channel and which are emitted from a corresponding plurality of burners 13. The construction by means of which the channel 11 is moved and the carbon deposited thereon scraped off, forms no part of the present invention and the details thereof have been eliminated for the sake of simplicity.

In accordance with the present invention, the metal shed 11, in which the carbon black forming apparatus is enclosed has the outside walls thereof insulated to check the radiation of the heat therefrom. The means for checking this radiation may take the form of a coating of asbestos 14 disposed in apposition to the walls of said shed 10. By checking the radiation of the heat from the walls of the shed, the heat inside said shed can be more economically maintained at a higher temperature than would be the case if the amount of air entering the shed were affected. This increase in temperature produces a corresponding increase in yield, and the quality of the carbon black deposited as a result thereof is of a much superior quality than that otherwise produced. However, it should be noted that the temperature in said metallic shed should not be made to exceed a heat sufficient to effect such metal parts of the system as the burners, channels and the like.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

Having thus described my invention, what I claim as new and desire to secure by Letters Patent is:

1. The process of manufacturing carbon black, which includes impinging a hydrocarbon flame on a metallic plate, and retarding the radiation of heat from the plate by enclosing the plate and flame in an enclosure having heat insulated walls.

2. An apparatus for manufacturing carbon black, including a metal plate, a burner for producing a hydrocarbon flame impinging on said plate, and an enclosure for said plate and burner, said enclosure having the walls thereof insulated against heat radiation.

Signed at New York in the county of New York and State of New York this 2nd day of July A. D. 1930.

GEORGE CHARLES LEWIS.